United States Patent
Martin Lloret et al.

(10) Patent No.: US 10,048,666 B2
(45) Date of Patent: Aug. 14, 2018

(54) SYSTEM AND METHOD FOR THE DISTRIBUTED CONTROL AND MANAGEMENT OF A MICROGRID

(71) Applicant: GREEN POWER TECHNOLOGIES, S.L., Seville (ES)

(72) Inventors: Pablo Martin Lloret, Cadiz (ES); Luis Galvan Garcia-Perez, Seville (ES); Eduardo Galvan Diez, Seville (ES); Juan Manuel Carrasco Solis, Seville (ES)

(73) Assignee: GREEN POWER TECHNOLOGIES, S.L., Seville (ES)

( * ) Notice: Subject to any disclaimer, the term of this patent is extended or adjusted under 35 U.S.C. 154(b) by 185 days.

(21) Appl. No.: 15/116,131

(22) PCT Filed: Feb. 3, 2014

(86) PCT No.: PCT/EP2014/051983
§ 371 (c)(1),
(2) Date: Aug. 2, 2016

(87) PCT Pub. No.: WO2015/113637
PCT Pub. Date: Aug. 6, 2015

(65) Prior Publication Data
US 2017/0176965 A1    Jun. 22, 2017

(51) Int. Cl.
*G05D 17/00* (2006.01)
*G05B 19/042* (2006.01)
*G06Q 10/06* (2012.01)

(52) U.S. Cl.
CPC ..... *G05B 19/042* (2013.01); *G06Q 10/06315* (2013.01); *G05B 2219/2639* (2013.01)

(58) Field of Classification Search
CPC . G05B 19/042; G05B 2219/2639; H02J 3/32; G06Q 10/06315
See application file for complete search history.

(56) References Cited

U.S. PATENT DOCUMENTS

| 2005/0034023 A1 | 2/2005 | Maturana et al. |
| 2010/0179704 A1* | 7/2010 | Ozog ............... G06Q 10/06315 700/291 |
| 2014/0018969 A1* | 1/2014 | Forbes, Jr. ................ H02J 3/32 700/295 |

FOREIGN PATENT DOCUMENTS

| WO | 2012015508 A1 | 2/2012 |
| WO | 2012058114 A2 | 5/2012 |

OTHER PUBLICATIONS

A.M. Wildberger; Autonomous adaptive agents for distributed control of the electric power grid in a competitive . . .; May 1997; 1997 First Intl Conference on Knowledge-based intelligent electronic systems; vol. 1; pp. 2-11; XP010242668.
(Continued)

*Primary Examiner* — Tuan Vu
(74) *Attorney, Agent, or Firm* — Lucas & Mercanti, LLP

(57) ABSTRACT

System and method for the distributed control and management of a microgrid. The system comprises a plurality of intelligent devices in communication through a network with a data model unit for storing global parameters of the microgrid, an input profile generator module and an exchange manager module. When a global parameter is updated in a data model unit, it is replicated in every data model unit. A first set of intelligent devices is associated and in communication with different power devices of the microgrid, the data model units collecting data monitored by the power device and the input profile generator module iteratively calculating an available range of power that the power device can produce or consume. The exchange manager module iteratively calculates power exchanges between different power devices of the microgrid considering the available ranges of power of the power devices and at least one input parameter.

23 Claims, 5 Drawing Sheets

(56) References Cited

OTHER PUBLICATIONS

T. Nagata, et al; a multi-agent approach to power system restoration; Power System Technology; Dec. 2000; vol. 3; pp. 1551-1556.
International Search Report dated Sep. 16, 2014 for PCT/EP2014/051983.

\* cited by examiner

SYSTEM AND METHOD FOR THE DISTRIBUTED CONTROL AND MANAGEMENT OF A MICROGRID

CROSS REFERENCE TO RELATED APPLICATION

This Application is a 371 of PCT/EP2014/051983 filed on Feb. 3, 2014, which is incorporated herein by reference.

FIELD OF THE INVENTION

The present invention relates to a distributed management and control system and method which contributes to the stability and dynamically improves the quality of a microgrid or a smart grid. A smart method capable of taking decisions autonomously and the necessary hardware for its implementation is also proposed.

The system is responsible of monitoring and acting on the microgrid to maintain the stability of said microgrid. This system allows the different power devices connected to the micro-grid, to exchange, practically in real time, electrical power and services related to electrical power quality without the necessity of a central controller system, a central energy manager or system operator.

These exchanges are managed automatically in dependence of parameters chosen according to a number of configurable criteria. Some of these parameters will be selected by the user while some others may be managed by the infrastructure owner which is responsible for enforcing legislation in the grid. In this way, parameters such as pollution in the production of this energy, the priorities among consumers, distinction between essential and non-essential loads and priorities among producers, can be controlled to achieve a particular target as might be the reduction of greenhouse gas emissions into the atmosphere, maximizing the penetration of renewable energy or reducing the circulating current between different bus-bar.

BACKGROUND OF THE INVENTION

The high-depth penetration of distributed energy resources (DERs) causes stability problems in the main power grid. An economically viable and widely accepted technique to reduce the effect of DERs in the main grid widely accepted is the use of micro-grids. The problem in this regard is to develop the management and control of micro-grids efficiently. Basically, there are two main strategies to resolve this issues which can be categorized in droop-based method and non-droop based methods.

Droop-based methods operate based on local measurement and the adjustment of the operating point of the generators. The active (or reactive) power supplied by the generator, depends on changes in the frequency (or voltage) of the local generator. The main advantage of these methods is that they are autonomous and depend on local parameters, it is not necessary to use any communications systems. The main drawback is the stability problems that arise because proper load sharing (especially in island-mode) requires high values of gains in the controllers, which has a negative impact on overall stability.

The proposed method belongs to the second type of strategies: the non-droop based methods. These strategies can be further subdivided into three types of different methods:

Centralized control methods: In these methods, most of the process occurs on a central element, while the other elements have limited functionality and are generally focused on sending and receiving instructions between the central element of the device and the controllers. These methods require fast and high bandwidth communication. The central element is a critical component and if there are communication losses or processed failures in it, the entire system will collapse.

Master-slave methods: In these methods one element is the generator of the information and one or more are consumers. These methods are more flexible than centralized ones and facilitate connection and disconnection of new devices to the system. These methods allow other types of topologies among which can be highlighted the hierarchical agent-based methods.

Robust servomechanism control methods: These methods are robust to microgrid parametric uncertainties but it is not readily applicable to multiple DER units.

As mentioned, a significant number of management and control strategies of micro-grids are based on the use of hierarchical agent-based methods.

These methods employ devices or "agents" with different functionality according to their situation in the hierarchy. They usually use (at least) one distribution system operator (DSO) agent level, to pass appropriate instructions to each one of the microgrids, a microgrid agent level, to receive instructions from the DSO, and generally to perform load sharing, support and submitting instructions to the local agents and the local agent level. Among the local agents, a distinction is usually made between load agents and microsource agents. Local agents may have different functionality depending on the device associated with them (loads, solar generator, wind generator, battery, etc.). Coordinating the different agents, many systems are able to optimize multi-objective systems to meet the demands of the micro-grid.

J. K. Kok, C. J. Warmer and I. G. Kamphuis in 2005 presented in their paper "PowerMatcher: Multiagent Control in the Electricity Infrastructure" a management system of power trade-off in the microgrid with a market-based control. Power Matcher project continued to develop and the same authors, along with other ones, published in 2012 the article "Dynamic Pricing by Scalable Energy Management Systems—Field Experiences and Simulation Results using PowerMatcher", where they showed their progress in the management of microgrids using the Power Matcher. That same year, K. Kok, along with Yi Ding, Preben Nyeng, J. Østergaard, M. Dang Trong, S. Pineda, G. B. Huitema and O. S. Great published the document "Ecogrid EU—A Large Scale Smart Grids Demonstration of Real Time Market-based Integration of Numerous Small DER and DR", disclosing a system for management and billing of power trade-off similar to Power Matcher. The main feature of these systems is to solve power trade based on a market control. While they are able to provide a rapid response, they only managed the set points of power to trade-off active power, but ignore reactive power, neither have mechanisms to monitor and correct the grid faults. Besides the fact of using a market-based method, it proves that there is competition between the elements to obtain resources; moreover energy price is imposed in both systems from a higher-level agent which would not satisfy all the "elements" present in the microgrid.

Another management method control-market based on multi-agent is presented in 2009 by Zhang Jian, Qian Ai, Chuanwen Jiang, Xingang Wang, Zheng Zhanghua, Gu Chenghong in "The application of Multi Agent System in Microgrid coordination control". It is a system based on three levels of hierarchy, in addition to setting the energy price and balancing the exchanged power, it aims to optimize the use of solar energy and to be able to act against system failures either to operate connected to the main grid or to operate in island-mode. However, the method has a specific solution for a specific microgrid without offering any possibility of generalization; therefore, only the scheme of hierarchical agents presents some practical interest.

In "Multi-Agent System (MAS) for Short-Term Scheduling of a Microgrid Generation" from 2010 and "Multiagent System for Real-Time Operation of a Microgrid in Real-Time Digital Simulator" from 2012, the authors T. Logenthiran, D. Srinivasan, A. M. Khambadkone and H. N. Aung describe an agent-based system, whose main features are that the "local agents" have multiple functionalities and can be considered intelligent devices. Another important feature is the short-term scheduling capacity of the system. Furthermore, the system has the capability of compensating reactive power in addition to the active power. The system aims to optimize the energy efficiency by solving objective functions. The drawback is that the local agents do not have enough computing power and optimization of the objective function is performed only in higher-level agents, which makes these elements critical and essential for the proper functioning of the microgrid.

Similar conclusions can be reached in studies of Amir H. Etemadi, E. J. Davison, Reza Iravani. In the documents "A Robust Decentralized Control Strategy for Multi-DER microgrids-Part I: Basic Concepts" and "A Robust Decentralized Control Strategy for Multi-DER microgrids-Part II: Performance Evaluation", both from 2012, an agent-based system where "local agents" assume most of the functions of the system is described. They assume a robust parametric design which is able to act against the uncertainties of the system. They also have the ability to connect or disconnect the DER units and are coordinated in a distributed manner. However, centralized components which represent higher hierarchy agents are responsible for transmitting the reference power by the system. The main drawback of this strategy is that modeling from several types of controllers is based on the linearization of a microgrid model of a specific grid. This presents an obstacle for the generalization of the solution for a generic microgrid topology. Also, if the topology of the microgrid is complex or has a large number of elements, the linearization of the model usually becomes tedious and inflexible to changes in grid topology.

Patent document CN102810186-A relates to a multi-time scale microgrid energy optimizing management system structure and method. Agents would operate in a cooperative and coordinated way to achieve the objectives. The system is capable to realize an ultra-short-term microgrid energy optimization, allowing it to detect and act against faults, using emergency supplies if necessary. "Main electric grid dispatching agents" are necessary to perform the data processing of all the distributed agents. In addition, such systems with short term optimization require the support of high performance communication. This is the case of patent document CN102801790-A, disclosing a multi-agent system employing high performance communication based on IEC 61850. This method obtains the appropriate interaction among agents from a "control unit center agent" of higher hierarchy. Another possible example is the invention disclosed in patent document CN102684199-A. The main feature of this invention is a multiple time scale control method which allows a super-short-term power generation prediction and super-short-term load prediction during real time control which effectively avoids problems such as balance and frequency adjustment in addition to judge the set point whether output power of each power supply in the micro grid is appropriate.

Other systems based in stratified coordination control system of a microgrid are disclosed in patent documents CN102832706-A and CN102710013-A. The former is a system that scientifically manages distributed power, stored energy and load in the microgrid. It manages power generation and dispatching plans, achieves rational power supply, satisfies load power supply requirement of the microgrid, effectively solves operation reliability problem of the power distribution grid, satisfies trait power requirement of the specific user and improves comprehensive utilization efficiency of all kinds of energy. The latter is an invention that relates to a park energy-network energy optimizing management system. The system is a three-layered structure. Through computing the objective function values at various states by a multi-objective optimizing algorithm based on weight, the defect of randomness and intermittence of the distributed power source is overcome, the complementary problem among multiple microgrids and multiple micro power sources in the microgrid in the park energy grid is solved, and optimized utilization of clean energy and maximization of system energy efficiency can be achieved. In both systems, the central element, or higher level of hierarchy, assumes most of the functionality and processing, becoming critical elements, as they are those that resolve multiobjective function.

The method disclosed in patent document CN102723713-A is characterized in that each data flow is processed differently according to systems or devices with different functions. The method, in the distributed energy microgrid environment, is based on already obtained accurate and reliable flow calculation data which is respectively sent to a microgrid controller, a local energy management system, a remote scheduling system and also special mention to a static reactive power compensation system.

Finally, patent document WO2013018106-A2 discloses an intelligent user-side power management device (PMD). The PMD is comprised of an optional energy storage unit and can interact with a utility grid or microgrid to eliminate power theft and efficiently provide clean energy to the users of the grid while helping to the grid to do smart demand response management, particularly for renewable energy grids, which need to efficiently manage the slack due to the large variability in power generation. In any case, PMDs are managed by a central controller connected to a remote wireless transceiver so that the central element is again a critical component.

DESCRIPTION OF THE INVENTION

The proposed method and associated hardware is related to the control and management of a microgrid or a small smart grid, through actions of monitoring, sharing information and performance control. The proposed management model is based on the use of a distributed scheme, which is coordinated in a distributed manner. To do so, the method uses a Common Telecommunications Infrastructure (CTI) associated to each one of the electrical devices present on the microgrid. Therefore, the proposed scheme is not based in the hierarchical agent-method or any other hierarchy topology.

A first aspect of the present invention refers to a system for the distributed control and management of a microgrid.

The system comprises a plurality of intelligent devices in communication through a network, each intelligent device comprising:

- a data model unit for storing and updating a data model with global parameters related to the elements of the microgrid;
- a plurality of modules in communication with the data model unit, including an input profile generator module and an exchange manager module for iteratively calculating power exchanges between the elements of the microgrid.

All the exchange manager modules are coordinated to simultaneously calculate power exchanges at each iteration. Every time a global parameter is updated in the data model unit of an intelligent device said updated global parameter is replicated in the data model units of the remaining intelligent devices. The plurality of intelligent devices in turn comprises a first set of intelligent devices, wherein each intelligent device of said first set is associated and in communication with a different power device of the microgrid such that its data model unit is configured to collect data monitored by the associated power device and its input profile generator module is configured for iteratively calculating an available range of power that the associated power device can produce or consume. The exchange manager module of each intelligent device is configured for iteratively calculating power exchanges between the different power devices of the microgrid taking into account the available ranges of power of the power devices and at least one input parameter for each intelligent device.

The input profile generator module of each intelligent device of the first set is preferably configured to calculate the range of active power, reactive power and/or harmonic power that the associated power device can produce and/or consume in the next iteration.

In a preferred embodiment the plurality of intelligent devices further comprises a second set of intelligent devices, wherein at least one intelligent device of said second set comprises a system supervisor and alert manager module for monitoring the correct operation of the elements of the microgrid and managing an alert in case of malfunction, and such that its input profile generator module is configured for iteratively calculating the range of active power, reactive power and/or harmonic power to be injected to the microgrid to improve stability of the microgrid or to modify the impedance of the electric lines of the microgrid.

Each exchange manager module may be configured to calculate the active power exchange, the reactive power exchange and/or the harmonic power exchange between the different elements of the microgrid, using at least one priority parameter associated to each intelligent device as the at least one input parameter.

The at least one priority parameter may comprise, for at least one kind of power exchange to be produced and/or consumed:

- an own priority value, which for the intelligent devices of the first set represents the priority of the associated power device within the microgrid, and
- a limit priority value, which for the intelligent devices of the first set represents the required minimum own priority value with which the associated power device is willing to exchange power.

Own priority values and limit priority values are also associated to any present intelligent device of the second set. Since these intelligent devices are not associated to any power device of the microgrid, they refer to the microgrid itself instead. All the own and limit priority values are treated equally irrespective of the set the associated intelligent device belongs to.

The plurality of modules in communication with the data model unit may also include an optimal calculation of priority parameters module for iteratively calculating an optimal set of priorities to be applied on all the intelligent devices for a period of time using estimations of the supply and demand.

In a preferred embodiment, the at least one input parameter for each intelligent device includes a geographical criterion, which for the intelligent devices of the first set considers the location of the associated power device within the microgrid; wherein the geographical criterion is based on assigning different groups within the microgrid, so that agreements of power exchange between elements of the microgrid are established according to the at least one priority parameter associated to the corresponding intelligent device, and among elements of the microgrid with the same value for said priority parameter for which at least one but not all the elements can achieve the required power exchange, agreements that minimize the total amount of active power, the reactive power and/or harmonic power flowing between different groups take precedence.

In another preferred embodiment the at least one input parameter for each intelligent device includes a geographical criterion, which for the intelligent devices of the first set considers the location of the associated power device within the microgrid; wherein the geographical criterion is based on assigning different groups within the microgrid, so that agreements of power exchange between elements of the microgrid within the same group are first established, and the remaining elements of the microgrid not achieving the required power exchange establish a power exchange agreement with elements of the microgrid belonging to a different group. In this case the geographical criterion is also based in limiting the maximum active power, reactive power and/or harmonic power each group can produce or consume.

The at least one input parameter for each intelligent device may include an interest parameter indicative of a level of interest in the power exchange to be performed between elements of the microgrid. The input profile generator module of each intelligent device may be configured to obtain the interest parameter. Unlike the own and limit priority values, which are either agreed by all users or determined by the system, the interest parameter is intended to represent the final user interest. The input profile generator is consequently configured according to the user interest.

In a preferred embodiment one of the intelligent devices acts as a coordinator configured for coordinating all the exchange manager modules to simultaneously calculate power exchanges at each iteration. The assignment of an intelligent device acting as a coordinator is variable in time.

The plurality of modules in communication with the data model unit of each intelligent device of the first set preferably include a system supervisor and alert manager module for monitoring the correct operation of the associated power device by comparing the power exchange calculated for said associated power device with the corresponding measurement of power, and managing an alert in case of malfunction.

The system supervisor and alert manager module of at least one intelligent device of the first set is preferably configured for monitoring the correct operation of the elements of the microgrid and managing an alert in case of malfunction, and such that its input profile generator module is configured for iteratively calculating the range of active power, reactive power and/or harmonic power to be injected to the microgrid to improve stability of the microgrid or to modify the impedance of the electric lines of the microgrid.

In case of detecting malfunction of an associated power device, the system supervisor and alert manager module of the intelligent devices of the first set is preferably configured to disconnect said associated power device from the microgrid.

The system may further comprise a common database where the global parameters are stored and updated, such that the data model unit of the intelligent devices is configured to update the global parameters of the microgrid by retrieving said information from the common database.

A second aspect of the present invention refers to a method for the distributed control and management of a microgrid. The method comprises:
  storing and updating, in a plurality of intelligent devices in communication through a network, a data model with global parameters related to the elements of the microgrid;
  each intelligent device iteratively calculating power exchanges between the elements of the microgrid, such that all the intelligent devices are coordinated to simultaneously calculate power exchanges at each iteration;
  every time a global parameter is updated in an intelligent device, replicating said updated global parameter in the remaining intelligent devices.

The plurality of intelligent devices in turn comprises a first set of intelligent devices, wherein each intelligent device of said first set is associated and in communication with a different power device of the microgrid. The method further comprises:
  collecting data monitored by each associated power device and iteratively calculating an available range of power that the associated power device can produce or consume;
  each intelligent device iteratively calculating power exchanges between the different power devices of the microgrid taking into account the available ranges of power of the power devices and at least one input parameter for each intelligent device.

In a preferred embodiment the method further comprises each intelligent device of the first set calculating the range of active power, reactive power and/or harmonic power that the associated power device can produce and/or consume in the next iteration.

The plurality of intelligent devices may comprise a second set of intelligent devices, and in that case the method preferably comprises monitoring, by at least one intelligent device of said second set, the correct operation of the elements of the microgrid and managing an alert in case of malfunction, and calculating the range of active power, reactive power and/or harmonic power to be injected to the microgrid to improve stability of the microgrid or to modify the impedance of the electric lines of the microgrid.

The method may further comprise each intelligent device calculating the active power exchange, the reactive power exchange and/or the harmonic power exchange between the different elements of the microgrid using at least one priority parameter associated to each intelligent device as the at least one input parameter.

The method may further comprise iteratively calculating an optimal set of priorities to be applied on all the intelligent devices for a period of time using estimations of the supply and demand.

The method may further comprise one of the intelligent devices coordinating all the exchange manager modules to simultaneously calculate power exchanges at each iteration, and wherein the assignment of an intelligent device acting as a coordinator is variable in time.

In a preferred embodiment the method further comprises monitoring, by each intelligent device of the first set, the correct operation of the associated power device by comparing the power exchange calculated for said associated power device with the corresponding measurement of power, and managing an alert in case of malfunction.

The method may further comprise monitoring, by at least one intelligent device of the first set, the correct operation of the elements of the microgrid and managing an alert in case of malfunction, and iteratively calculating the range of active power, reactive power and/or harmonic power to be injected to the microgrid to improve stability of the microgrid or to modify the impedance of the electric lines of the microgrid.

The method preferably comprises disconnecting an associated power device from the microgrid in case of detecting malfunction of said associated power device.

The method may further comprise storing and updating the global parameters in a common database, such that the intelligent devices update the global parameters of the microgrid by retrieving said information from the common database.

BRIEF DESCRIPTION OF THE DRAWINGS

A series of drawings which aid in better understanding the invention and which are expressly related with an embodiment of said invention, presented as a non-limiting example thereof, are very briefly described below.

DESCRIPTION OF A PREFERRED EMBODIMENT OF THE INVENTION

Figure 1:
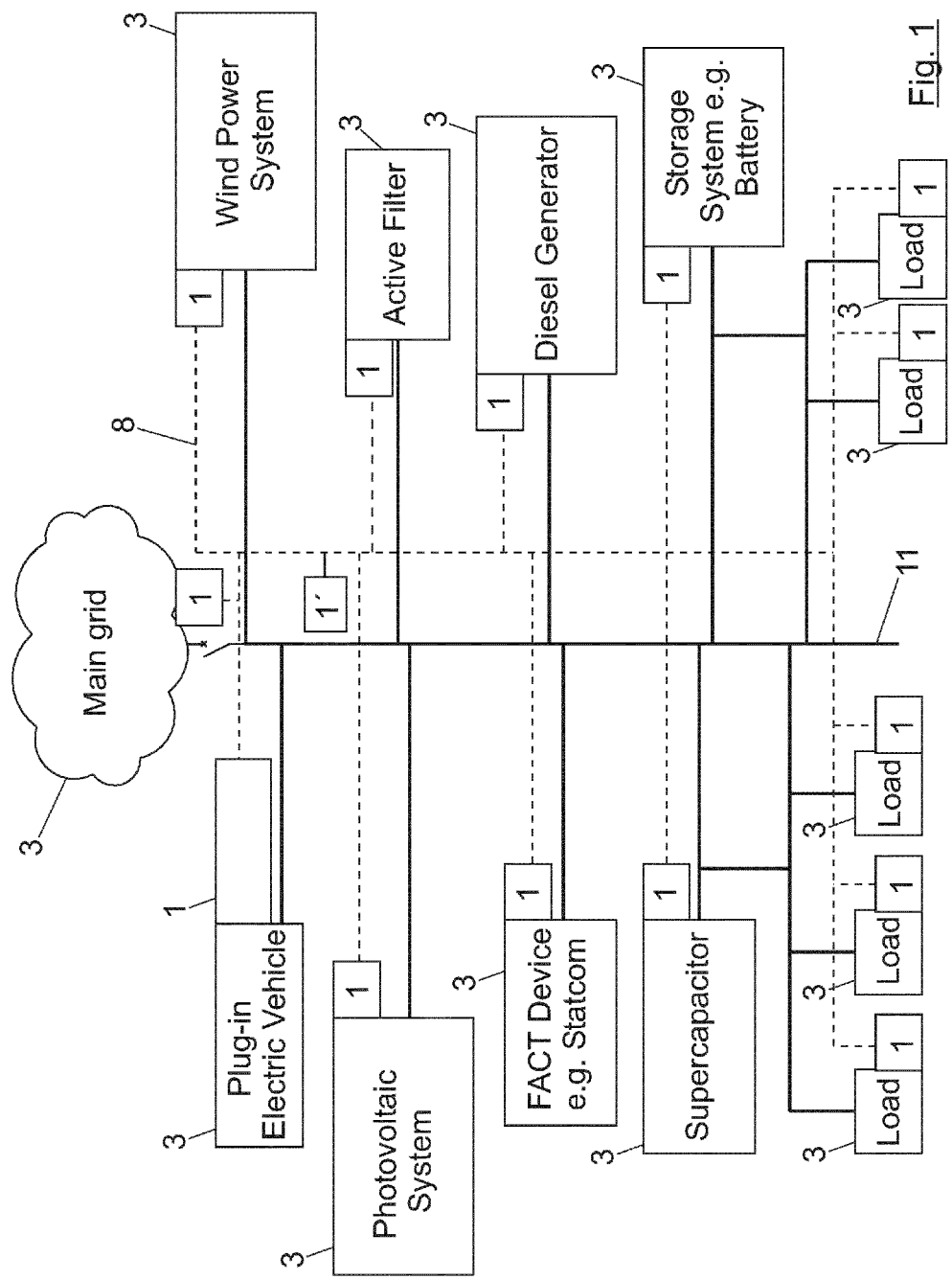
FIG. 1 shows a general schedule of a microgrid where the proposed distributed method is being applied.

FIG. 1 shows, as an example, a general diagram of a microgrid where the proposed distributed system and method is applied. The distributed system comprises autonomous and intelligent devices (1) which implement the proposed method. The microgrid is controlled by the conjunction of all the intelligent devices (1) in a distributed manner, without the need of a central controller.

Each intelligent device (1) can be associated to any type of power device (3) in the microgrid regardless of their nature. The power devices (3) are connected through the electric lines (11) of the microgrid. The connection of the microgrid to the main grid is also associated to an intelligent device (1) so that the main grid can be represented as another power device (3). A specific identifier could be used for each intelligent device (1). As it will be detailed later, the invention performs different actions, most of these are robustly defined and are common to every intelligent device (1) but a small part is dependent on each power device (3) and is set by configuration. The global aims are achieved through the collaboration between every intelligent device (1) and its coordinated actions.

To coordinate devices actions in the microgrid it is necessary to dispose a network (8) through which the intelligent devices (1) establish communication, preferably a high performance communication network in order to quickly share information. With this same purpose the invention proposes to employ data models with a "virtually-shared-database-based" scheme. These data models are stored in data model units (2), shown in FIG. 2, located in every intelligent device (1) which implements the method and they have the same "global parameters" related to all elements in the microgrid. Every time a global parameter is updated in the data model unit (2) of an intelligent device (1), its new value is replicated in the data model units (2) of all the other intelligent devices (1). In this way, since the method is always running in an iterative manner, each device or element in the microgrid has at any moment all the information which is needed to develop and manage all the "global tasks" for that iteration. Regarding the database design, a data model is defined with several "global parameters" corresponding to common tasks of the method for global purposes. A memory space of the data model unit (2) is used for "local parameters" related to the individual properties of each power device (3). The "local parameters" are used for tasks related to the associated power device only with local purposes, so they are not replicated in the other data models. These "local parameters" are employed to obtain certain "global parameters". This design can be performed for example by using standard high performance communication IEC 61850. Specifically it can be performed using the service "InformationReport" of the standard MMS services to update the "global parameters" of the data model. This is possible with the MMS protocol stack that uses TCP/IP and Ethernet to implement IEC 61850.

Figure 2:
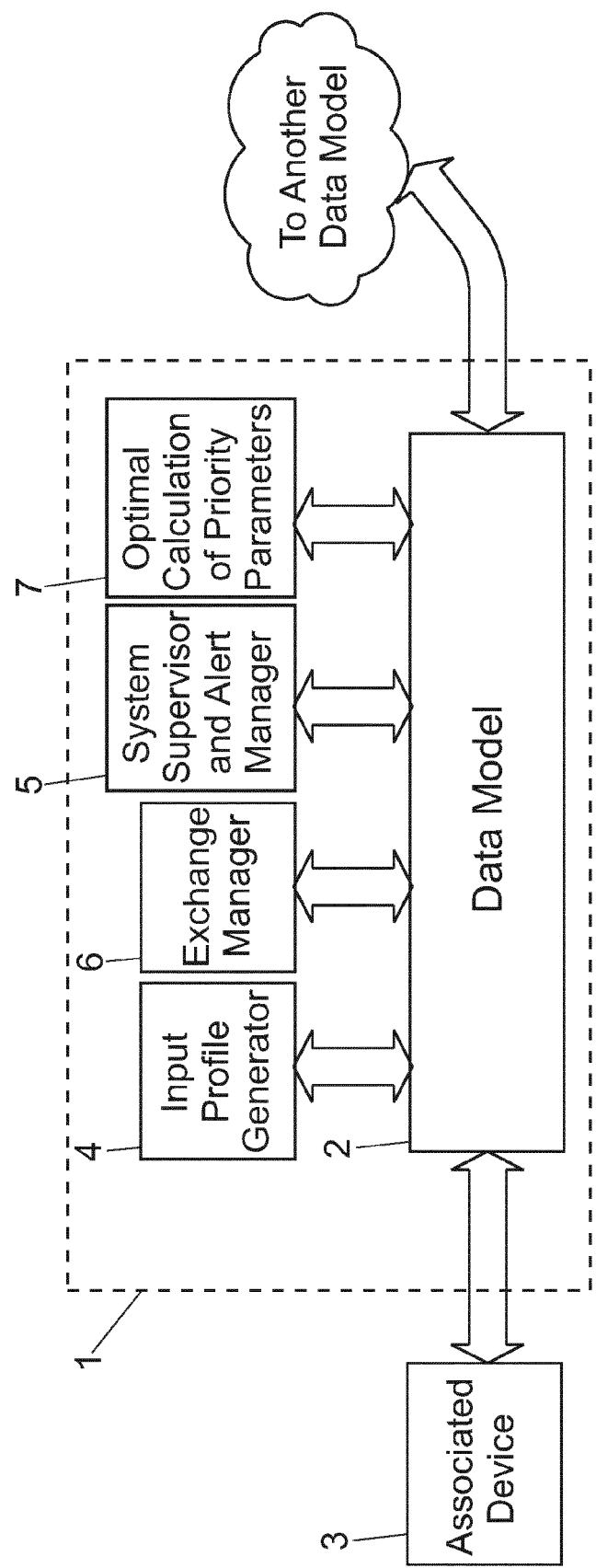
FIG. 2 shows the functional entities of the proposed intelligent devices.

Every intelligent device (1) makes several parallel processes whose tasks could be separated conceptually in several modules or entities. The functional entities of the proposed intelligent devices (1) are represented in FIG. 2. Specifically, each intelligent device (1) is an autonomous system that contains a data model with all the information needed to develop the management of power exchanging and any other essential functions. This information, own and from other power devices (3) managed by the proposed method, is stored in the data model unit (2) on each device locally, but its content is shared consistently in real time through the network (8). Therefore, it should be noted that the proposed method does not need to employ a centralized element that accumulates the information.

However, it is possible to employ such a central element for information storage. In such case, it would not be necessary to replicate the shared information, since all the intelligent devices (1) may access the same memory space. This central element would not make management decisions for the whole microgrid.

In contrast to methods based on hierarchical agents, interactions in the proposed design are "horizontal", all elements have the same functionality and are communicated with each other through a mechanism of "report" to share information. Advantageously this lack of critical elements provides robustness to the invention. Although the method processes its exchanges with the other devices without distinction, it is possible to reach a desirable behavior through the use of suitable priorities and interest parameters for any particular power device (3), as it will be later explained.

Intelligent devices (1) are connected to their associated power devices (3), like sources or loads, but they are not limited to a set of actions (such as agents with "demand response" in loads). These intelligent devices (1) are all identical and capable of performing all the necessary function. Thus each intelligent device (1) can be adapted to a specific associated power device (3) through its configuration.

Each intelligent device (1) performs four main processes simultaneously:
Updating data model.
Generating input profiles.
Managing the power exchanges made by the associated power device (3).
Monitoring the system and managing the alerts.

Different entities or modules of the intelligent devices (1) are configured to perform each of the last three processes, as represented in FIG. 2. In particular, the input profile generator module (4) generates the input profiles, the system supervisor and alert manager module (5) monitors the system and manages the alerts, and the exchange manager module (6) manages the power exchanges. In addition, an optional extra entity may be added to one or more intelligent devices (1): the optimal calculation of priority parameters module (7).

Each of these modules interacts with the power device (3) and/or with the other modules through writing and reading parameters of the data model unit (2). Each module obtains its input parameters from the data model unit (2) and writes the results in it. This way, each module of every intelligent device (1) is practically connected in real time.

Updating the data model consists of the acquisition of the necessary data from the associated power device (3), which can be a consumer, a producer or a prosumer power device. Thus the input data can be of any type and must be configured prior to the inclusion of the device in the microgrid. Moreover, the data model unit (2) is designed to collect the data monitored by the associated power device (3) as well as different aspects of the grid. In order to capture these values and transmit them to the data model unit (2) a known communications protocol is used such as Modbus, CAN, etc. Lastly, either external or internal changes related to data models units (2) designated by configuration must be shared and "replicated" to other data models units (2) (unless a common database is being used) to keep the information consistent and virtually shared. Some "local parameters" that only affect the associated power device (3) will not be replicated, only those ones required for distributed management are replicated.

The input profile generator module (4) is responsible of collecting the data model parameters deemed necessary, such as the characteristics of the associated power device (3), the state of the microgrid, etc. This process is configurable and depends on the associated power device (3) but ultimately provides a common device-independent output.

Figure 4:
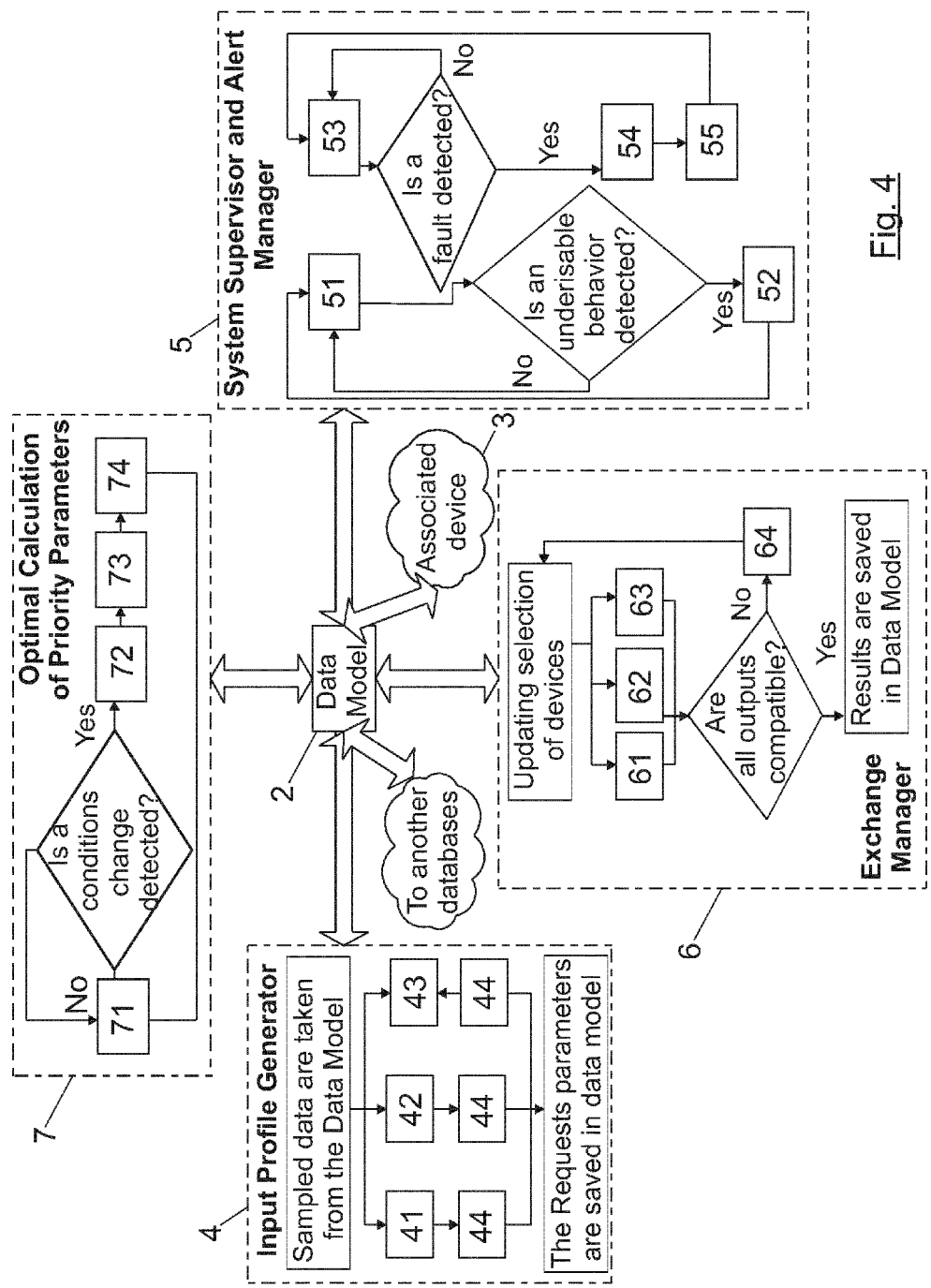
FIG. 4 is a graphical description by block diagrams of the different modules of each intelligent device.

FIG. 4 shows schematically the processes running on the different modules of the intelligent device (1). Regarding the input profile generator module (4), its main function is to obtain "global parameters" necessary to make power exchanges request. The way to obtain the output parameters depends on individual properties of the associated power device (3) and on the application intended by its user. The task of input profile generator module (4) is to obtain the range of active, reactive and harmonic power (41-43) that the associated power device (3) may produce or consume in the next method iteration, as well as the interest parameter (44) of the user for the power device (3) to do so. The user configures the input profile generator module (4) so that it can accomplish this task using the necessary information. For example, if the associated power device (3) is a photovoltaic system, the input profile generator module (4) may be configured to calculate the power the photovoltaic system is capable of supplying to the grid using parameters like panel voltage, the maximum circulating current, any information about the weather and so on. When the power device (3) is a load, the measurement of current and the nominal values of the load could be used by the input profile generator module (4). In the case of a battery, a suitable parameter could be the state of charge. The associated power device (3) must be able to generate or consume any power value within the range calculated, because if the request is "served", the devices will have to consume or generate the agreed final power. It is possible to sample the measurements and save values in the data model unit (2) using a protocol known to be compatible with the implementation of data model unit (2), such as Modbus.

The system supervisor and alert manager module (5) has the main function of collecting various parameters from the data model unit (2) and check them. It checks the state of the associated power device (3), that is, if it is operating correctly and has consistency with the previously agreed energy exchanges. Otherwise, it triggers sets of alarms in the data model, which would cause the disconnection of the associated power device (3) from the grid. In addition the system supervisor and alert manager module (5) is responsible (if so configured) to monitor and check the status of the grid. If necessary, it may interact with the input profile generator module (4), through the data model unit (2), to carry out "virtual exchange requests" that will help to restore the grid, providing the method has the capability to confront the faults.

FIG. 4 shows the system supervisor and alert manager module (5) and its main task, the supervision (51) of its associated power device (3) behavior. However it also shows its additional features like monitoring the grid (53) or other power devices. To assure that the real output power values of the associated power device corresponds to the values agreed by the exchange manager module the module checks the agreed value and the corresponding measurement of power (51). If the difference among values (relative to the magnitude and time) exceeds a certain threshold, the module triggers an alarm flag (52) in the data model unit (2). In turn, this variable is checked by the input profile generator module (4) and if it is active, it follows a certain action, such as setting the range of powers available to 0 (no electric power available) in order to prevent the associated power device (3) from exchanging power with the other power devices. Another possibility is that the alarm flag is periodically consulted by some external device (using Modbus for example) capable of activating the protections and to disconnect the power device (3).

The microgrid monitoring (53) can be performed in a similar manner. For example, it is possible to check a grid value such as the voltage or frequency of a determined node of the grid. This value is sampled and saved in the data model unit (2). The system supervisor and alert manager module (5) of one or more intelligent devices (1) checks these values and compares them with sets of configured values to detect faults. When the system supervisor and alert manager module (5) detects the fault, it writes a certain value in an alarm flag (54) which is periodically checked by the input profile generator module (4) of one or more intelligent devices (1). In addition to this, the system supervisor and alert manager module (5) sets a value in a reference parameter defined in data model. This way, requests of active, reactive or harmonic power with the highest priority can be made (55) to compensate the grid and ensure its stability.

It is even possible to associate an intelligent device (1') to a transmission line, or simply not to associate an intelligent device (1'), as shown in FIG. 1, with any power device (3), so that it may act as a "virtual controller" of the grid, with the ability to perform different power exchange requests according to grid requirements. This "virtual controller" does not consume or produce any power, but it can make requests to improve stability of the grid. When the grid voltage or frequency become out of the desired range, the virtual controller will request to provide or consume some active or reactive power. This request has the highest priority and will, therefore, be served. However since no power device is associated to the virtual controller, the requested power will not be produced nor consumed but instead, it will affect the microgrid voltage or frequency. The addition of flywheels is recommended for this method to better control the microgrid frequency. For example, a typical case would be the use of this "virtual controller" to do active power demands, to compensate for losses incurred in transmission lines due to exchanges produced. In this way, it is possible to improve and protect the stability of the grid.

Besides being capable of detecting grid fault, the method is capable of changing the operation mode. It is definitely possible to operate in grid-connected mode or in island mode, as well as during the transition between both states. In order to preserve the stability, and given the nature of the cooperative control strategy, the method may use storage devices such as batteries, supercapacitors, electric vehicles and so on to safeguard the stability of the microgrid and power exchanged quality. These would be controlled as any other associated power devices (3). For the same reasons, the method can make use of the emergency power source (such as a diesel generator), when necessary. All these actions are carried out as high priority requests of supply and demand coordinated by the distributed method through the functions of the system supervisor and alert manager module (5) and the exchange manager module (6). Although not required, for stability reasons and the characteristics of the managed grid, it is recommended to use a storage device (such as a supercapacitor) capable of compensating different response times of the different devices. This way, it is possible to maintain the grid frequency. The storage device would supply power to the grid when its frequency is too low and take power from the grid when its frequency is too high. If there is a continuous unbalance in the grid "in one way" for too long, the storage device is discharged completely or reaches its load limit. To prevent this situation, an intelligent device (1) would make requests of active power that will maintain the storage device state of charge on a suitable value. In addition to storage devices, other supporting elements (such as flywheels) may be added if considered necessary or beneficial for the stability.

According to an advantageous further development, the system supervisor and alert manager module (5) can also manage the operation mode of the microgrid. By consulting the univocal identifier of each device, it is possible to know whether the grid is connected or not. It is possible to set a grid operation value in the data model which could be written by this module (5) and checked by all intelligent devices (1) to perform any necessary adjustments in their operation.

Even when the exchange manager module (6) has set a perfect balancing in the exchanges, there may be imbalances in the real effective power that power devices (3) produce or consume. A possible cause for this is the transmission losses in the line. These imbalances can be corrected by the "virtual controllers" which can make additional power request "to compensate" the transmission lines losses.

According to a further advantageous development, several virtual controllers may be assigned to different zones of the microgrid and, with the right configuration, make a set of coordinated requests of reactive power to modify the impedance of the lines. This can be used to distribute the flow of power through the different lines of meshed microgrids.

It is further possible to use supercapacitors in the microgrid which work in a similar way as the virtual controller: providing or consuming the necessary power to maintain the grid voltage and frequency. This group of supercapacitors would not be associated to any intelligent device (1). In this case, the virtual controller would make requests to maintain the energy stored in the supercapacitors in a particular range. The super capacitor group would mitigate other imbalances that may arise due to the different response times of the power devices (3).

The exchange manager module (6) is always running and performing its function. It is responsible for designating the different power exchanges which take place between associated power devices (3) in the next iteration of the algorithm so its main function is to reach agreements between all power exchanges while keeping stability of the system. These exchanges must be made in such a way that the microgrid does not become unbalanced or unstable. Furthermore, the entire microgrid cooperates with common criteria such as efficiency, loss reduction, or the use of renewable energy. These targets are achieved with the use of parameters such as the priority of sources and loads, their geographical location and interest to carry out their exchanges. Unlike agents based methods, or those who have a central element, this operation is not performed by a power manager, or centralized element. Instead, each intelligent device (1) calculates the exchanges among the microgrid associated power devices (3). Although this can be seen as a disadvantage from standpoint of computational effort, this is done because of the nature of the microgrid, the completely distributed scheme and the generality of the system, since energy agreements will depend on the cooperative action throughout the iterations of the method between the individual grid elements.

All the exchange manager modules (6) are coordinated to simultaneously calculate power exchanges at each iteration. In order to maintain consistency when the exchange manager modules (6) of all the intelligent devices (1) start the next iteration, one of the intelligent devices (1) may be designated as a coordinator. The assignment of this role could be initially arbitrary and this role is continuously switched depending on criteria such as communication quality, changing the coordinator every certain time. Any intelligent device (1) is capable of being the coordinator. If a fault is produced on the current coordinator or if it leaves the network (8), the other intelligent devices (1) can complete the current iteration of the method independently with the information they have; on the next iteration of the method another coordinator is chosen. A possible way to select a new coordinator when no coordinator is detected consists of using part of the shared data model to allocate a coordinator request list. Whenever an intelligent device detects the absence of a coordinator, it consults the list. A random time period may be waited to prevent conflicts. If no other intelligent device has requested to be the new coordinator yet, then it requests to be the new coordinator. If two or more intelligent devices have requested to be the new coordinator, then all requests but one are discarded (for example the request that was made first may be chosen as the one which is not discarded). When only one request is left and it is the same for all the intelligent devices, then the intelligent device which made such request is the new coordinator. A voting system can also be employed to resolve conflicts and guarantee consistency. A possible way to switch coordinators consists of letting the current coordinator select the new one depending on the aforesaid communication quality criterion.

Regarding the duties of the exchange manager module (6), the proposed method, unlike other methods which process their exchanges in energy units, processes instantaneous power exchanges. This has two important implications. Firstly, the system is capable of operating at a very low time scale, which can be considered real time, favoring the rapid response of the system and making it possible to reduce the power (especially the reactive power) circulating through the microgrid and the consequential losses. Furthermore, unlike other methods, the proposed method is capable of performing a coordinated exchange of the active, reactive and harmonic power. Secondly, the fact of being able to perform the compensation of harmonic power (in addition to active and reactive power) through agreements between devices is already in itself a novelty in the state of the art. Currently, the FACTS equipment for reactive power compensation, or active filters used for harmonic compensation monitors and acts on the grid, performing the required compensation when they detect a lack of quality. In the proposed method, the devices know their characteristics and may agree previously to compensate the reactive power (inductive or capacitive) and the harmonics. Thus it is possible to anticipate the decline in the quality of the microgrid and improve time response. It is also possible to have at all times knowledge and control about what is being compensated and the remaining compensation capacity. The method therefore works on the compensation of the different powers (active, reactive and harmonics) which are managed and coordinated simultaneously; allowing the method to discard agreements among devices if any of them has not fulfilled all critical demands and so cannot be taken into compensation account. Thus if a power device (3) fails to satisfy some of their demands, such as its reactive or harmonics compensation, it will also be excluded for active power exchanging. The method will be iterated as many times as necessary for the remaining power devices until a suitable solution is found. This simultaneous compensation of powers presents an advantage over systems that handle different types of power separately. The proposed method, doing it in a coordinated manner, is more robust. At any time, the system has control of different magnitudes to exchange, thus, situations of degradation in the quality of energy in microgrid are consistently avoided. The combination of these aspects allows reducing the necessary infrastructure for the grid since parameters such as the required reserve power may be lowered. It is possible that the method may reach agreements both for production and consumption if the device is a prosumer like storage devices or the main grid. In these cases, the method calculates the difference between production and consumptions for that intelligent device (1).

For the management agreement for the exchange of each type of power (active, reactive, harmonics), the method proposes three criteria. One of them is the priority of the associated power device (3), another one is its geography and the last one is the interest in the exchange. The proposed method sorts the requests according to these parameters.

At the beginning of each iteration the exchange manager module (6) of each intelligent device (1) obtains some input value from the data model unit (2). The coordinator element of communication indicates when an iteration starts, so that all the data models input values for every exchange manager module (6) are the same (although it is possible that some devices start with different values).

The input parameters for the exchange manager module (6) include the range of each type of power (active, reactive and harmonic) each device can supply and/or consume, their "Own Priorities", "Limit Priorities" and the interest parameter of each one. A geographical criterion is also taken into account by grouping the power devices (3) in a geographical manner. A suitable way to do this is to consider that device of the same bus-bar belong to the same group (9) as is shown for example in FIG. 3. This information is used to reduce the losses and to prevent harmonics from circulating through the electric lines (11).

The exchange manager module (6) of each intelligent device (1) calculates the exchanges among every microgrid device using the previously mentioned parameters. At the end of each iteration, the exchange manager module (6) of each intelligent device (1) has calculated all the agreements and each device saves these results in the data model unit (2). This value could be consulting (by Modbus e.g.) from the control board of power devices to take the power references. Ideally the exchange manager module (6) of all the intelligent devices (1) should reach the same result, so through the exchange and test of the results, the devices can be corrected, redirected, or disconnected if a discordant behavior is detected. For example, this allows finding possible failures like communication failures. Upon contradiction, only the results of a particular intelligent device are used by all the devices. If any device loses its communication while the results are being checked, it chooses its own results as the correct values.

Each intelligent device (1) (and its corresponding associated power device) (3) has at least an "Own Priority" and a "Limit Priority" associated, both for production and for consumption of power (a total of four values for each type of power). If devices are just consumers or producers, their respective values in the exchange action they do not participate in will be trivial. The "Own Priority" value is representing the "rating" of the power device (3) within the microgrid. The "Own Priority" value is set by configuration and depending on the criteria used may be ascending or descending. In this description greater values of priority are used for higher priority or essential devices. The "Limit Priority" expresses a numeric value that represents the required minimum "Own Priority" with which each power device (3) is willing to exchange power with another one. Therefore, if one of them intends to exchange power with another, the "Limit Priority" of each power device must be lower or equal than "Own Priority" of the other for the exchange to be valid. This way of assigning priorities has two immediate advantages. Firstly, it allows establishing a set of individual criteria commitment to each device of the grid in the way that is set for each device with which other ones they are willing to exchange energy ("Limit Priority") and what their ratings as sources or loads in the grid are ("Own Priority"), to achieve a certain criteria (such as using renewable energy sources whenever possible). Furthermore, this form of prioritization is applicable to any source, load situation or objective. There is not a closed solution for a specific case but it is a general method for any purpose and quite flexible exchange of strategies, based on criteria established in prioritization.

Figure 3:
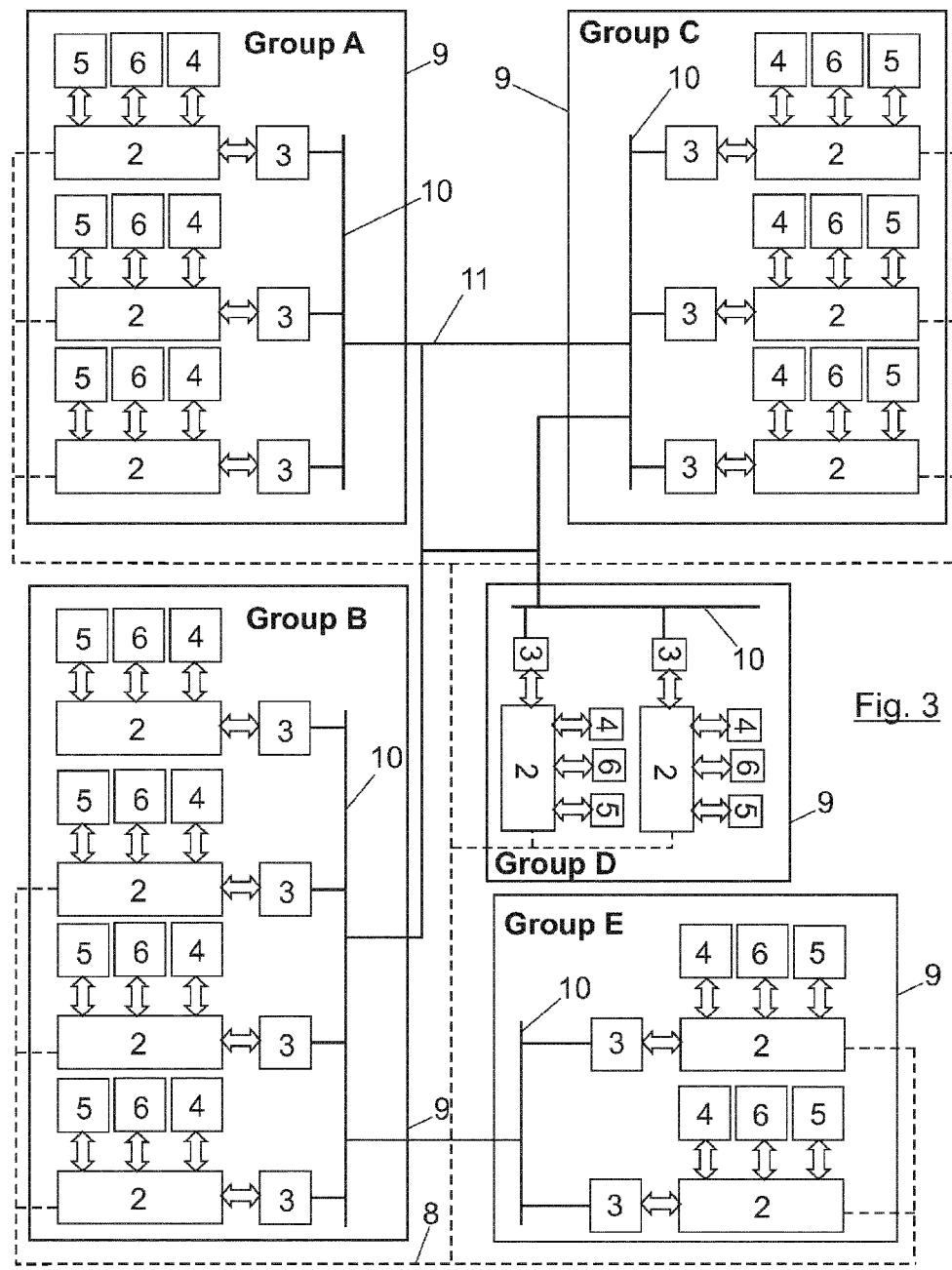
FIG. 3 shows an example of a microgrid topology where a geographical criterion is applied.

On its behalf, the geographical criterion is based on assigning different groups (9) within a microgrid, as it is shown in FIG. 3, where all devices in a group (9) are connected to the same bus-bar (10). To reduce losses in lines, it is intended that, wherever it is possible, exchanges take place between associated power devices (3) within the same group (9). In FIG. 3, which shows an example of a microgrid topology where the method is applied. Several groups (9) are taken according to a geographical criterion; in this case each group is formed by devices in the same bus-bar. It should be noted that the optimal calculation of priority parameters module (7) is not represented at any intelligent device (1) because it is an optional module.

Regarding the priority system and the geographical location data, the method provides two principal ways to proceed, that is, the method can adopt at least two different forms. For each type of power (active, reactive or n-th harmonic) the method may be configured to work in any of these ways.

FIG. 4 shows that for each type of power to be exchanged (active, reactive or harmonic), it is necessary to keep balancing on the microgrid. Thus, all types of exchanges must be managed in a coordinated manner. If a power device (3) cannot fulfill all its critical demands (such as its reactive or harmonics compensation), the method has to exclude (64) this power device (3) in order to assure balancing and stability. The device is also excluded from all the other exchanges process. One possible and simple way to do this is to calculate the possible exchanges of the different power types separately (61, 62, 63), discard those devices which cannot fulfill and then repeat the exchanges process for the remaining devices. Depending on the available power values to produce or consume may be appropriate to change the mode of proceeding with this. A possible way to proceed is to calculate all types of power exchanges (61, 62, 63) in parallel, discard the corresponding devices (64) and redo the process until a valid solution is found. This will be suitable if there are not too many power devices (3) at each exchange calculation. Another possibility it is to calculate first the exchanges for one type of power, discard the corresponding devices, repeat the calculations for the same power until all devices fulfil the conditions and then continue with the next type of power but only taking into account the devices which have not been discarded for the previous type of power, repeating the process for the remaining types of power until the end. Either way, it should be noted that the fact that a device does not fulfill its demand for active power does not have to be a reason for exclusion in other exchange processes.

The proposed exchange manager module (6) may work differently with each type of power (61, 62, 63). In particular, for this example, the priority system will take precedence for active power (61) while the geographical group system will take precedence for reactive power (62) and harmonic power (63).

For active power two tables or matrixes are formed, one with the demand data and the other with the supply data. Each table includes at least the following information for each power device (3): the available power range, the interest parameter, the "Own Priority" value and the "Limit Priority" value. Firstly, the tables are sorted by the "Own Priority". The supply requests are paired with the consumer requests, both in descending order of priority. In order for a pair to be valid, the Own Priority of the supplier must be greater or equal to the Limit Priority of the consumer and vice versa. This method of pairing continues until either a table has no more requests or none of the remaining requests can be paired (due to the limit priority). At this point, the values of "Own Priority" of the last paired power devices are checked and saved. All the paired requests for the devices which "Own Priority" is higher than those two saved above are fixed and scheduled to be served.

The geographical criterion is then applied to all the requests of the saved "Own Priority" and with a compatible "Limit Priority", irrespective of whether they were previously paired or not. Among them, it will be selected to serve the requests which most reduce the power that flows between groups. When doing this selection, the already scheduled requests are taken into account. Any remaining ties are solved using the interest parameter, if there still are ties, the device identifiers can be used to solve them.

For reactive power (62) and harmonics (63), the group criterion is proposed to take precedence to prevent harmonics and reactive power from circulating through the microgrid. Firstly all devices are separated in their respective groups (9), assigned by geographical criteria, then the invention proceeds to make the agreement between devices of each group separately. A supply and a demand table are created for each group, where the requests are sorted by "Own Priority" and paired as previously explained. The process continues until all the possible agreements are made for each group alone. Up to this point there is no reactive power scheduled to circulate between different groups. The remaining devices which have not achieved its reactive power exchanges yet could do it by agreement between different groups. It is possible to set a limit to the reactive power which may circulate through the grid, so the remaining devices could exchange some reactive power following a global properties criterion until reach this maximum value. Another possibility is to allow the reactive exchanges for devices with a priority value ("Own Priority") higher than a determined one, etc. Finally, a limit may be imposed for the reactive power that may flow into or out from each group independently. The way to proceed with the harmonics power is the same than with the reactive power except than it is not usually allowed to compensate harmonics between devices of different groups. All these settings depend on the quality of energy desirable in the grid.

This way to achieve agreements of active, reactive and harmonic power is only a recommended option. It is possible to establish different criteria if desired.

The calculated power exchanges between the different power devices (3) are stored in the data model unit (2) of the intelligent devices (1). Each intelligent device (1) indicates (e.g. via MODBUS) to the associated power device (3) the power to be exchanged with the grid (active power and/or reactive power). Alternatively, the associated power device (3) may itself consult the data model unit (2) of the associated intelligent device (1) to retrieve the power to be exchanged with the grid.

Figure 5:
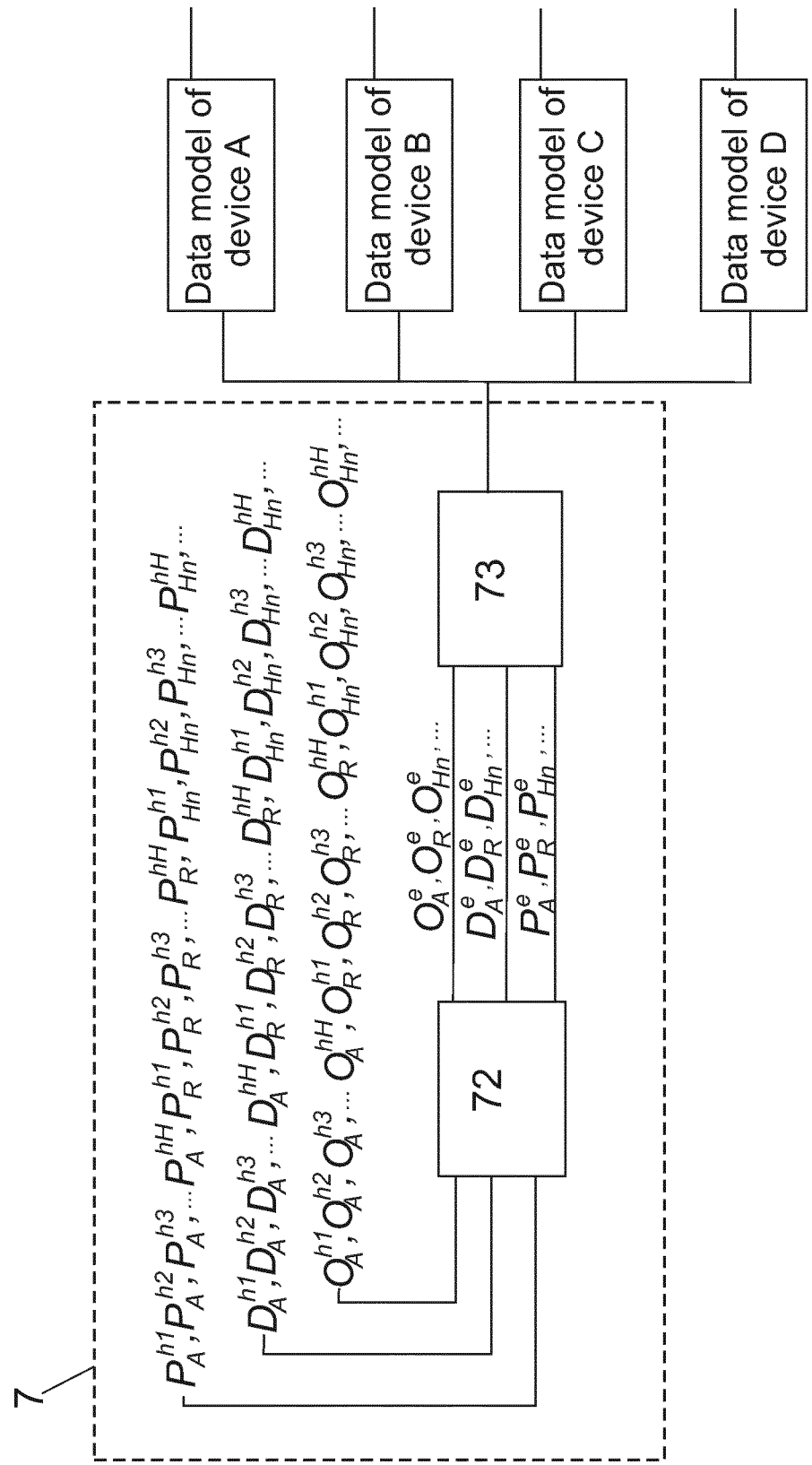
FIG. 5 shows a functional diagram block of optimal calculation of priority parameters module, with its respective input and output parameters.

Finally, the last aspect addressed by the invention is the way to set the optimal values of priorities for the system. As there is a relationship between the parameters of "Own Priority" and "Limit priority", the "Own Priority" value for each device is usually fixed by some user agreement at the beginning of the operation, while the "Limit Priority" values are switched over time to set different strategies. The "Own Priority" may also change for more complex strategies which switch the two parameters. For this function, the method proposes an off-line system, the optimal calculation of priority parameters module (7). This module is optional and not all the intelligent devices (1) are required to comprise it. The optimal calculation of priority parameters module (7) calculates the set of priorities to be applied for a period of time using estimations of the supply and demand, which are based on historical or predictive data. Through these parameters, the optimal calculation of priority parameters module (7) aims to obtain and allocate the optimal set of priorities for the microgrid power devices (3) in order to satisfy a number of criteria in the exchange of the power, as shown in FIG. 5. This calculation is performed using an iterative method, such as an evolutionary algorithm, so an initial set of priorities is also estimated by this module (7).

Given a generic time interval T, for example one day (24 h), priorities are used at a real-time scale. This priority set may change k times within T. In each of the k intervals (not necessarily equidistant in time), optimal priorities are recalculated according to the interests of the group of users. For example, the criteria may vary between different time zones, night and day, season, etc. These intervals may be programmed or otherwise anticipated so that the new set of priorities will be already calculated before the corresponding interval starts.

The method followed by the optimal calculation of priority parameters module (7) to calculate these priorities is schematically represented in FIGS. 4 and 5. During each interval, historical data for that interval is obtained from the data model unit (2) and stored (71) for a later use. This historical data includes for each type of power (active, reactive and for each harmonic) the productions ($O_A$, $O_R$, $O_{Hn}$) and consumptions ($D_A$, $D_R$, $D_{Hn}$) for each power device (3) of the microgrid present during the interval. The set of priorities used for said interval is also saved and stored. When the time to change the priority set is near or when a change in the conditions is detected, the productions ($O_A^\varepsilon$, $O_R^\varepsilon$, $O_{Hn}^\varepsilon$, ...) and consumptions ($D_A^\varepsilon$, $D_R^\varepsilon$, $D_{Hn}^\varepsilon$, ...) for the new interval are estimated (72). This estimation is based on the historical data previously stored:

$O_A^\varepsilon, O_R^\varepsilon, O_{Hn}^\varepsilon, \ldots = F(O_A^{h1}, O_A^{h2}, O_A^{h3}, \ldots O_A^{hH}, O_R^{h1}, O_R^{h2}, O_R^{h3}, \ldots, O_R^{hH}, O_{Hn}^{h1}, O_{Hn}^{h2}, O_{Hn}^{h3}, \ldots, O_{Hn}^{hH}, \ldots)$ $D_A^\varepsilon, D_R^\varepsilon, D_{Hn}^\varepsilon, \ldots = F(D_A^{h1}, D_A^{h2}, D_A^{h3}, \ldots D_A^{hH}, D_R^{h1}, D_R^{h2}, D_R^{h3}, \ldots, D_R^{hH}, D_{Hn}^{h1}, D_{Hn}^{h2}, D_{Hn}^{h3}, \ldots, D_{Hn}^{hH}, \ldots)$ An initial value for the new priorities is also estimated based on the stored priority sets.

$p_A^\varepsilon, p_R^\varepsilon, p_{Hn}^\varepsilon, \ldots = F(p_A^{h1}, p_A^{h2}, p_A^{h3}, \ldots p_A^{hH}, p_R^{h1}, p_R^{h2}, p_R^{h3}, \ldots, p_R^{hH}, p_{Hn}^{h1}, p_{Hn}^{h2}, p_{Hn}^{h3}, \ldots, p_{Hn}^{hH}, \ldots)$ The requests for production and consumption can be calculated off-line based on the estimations. Once calculated, the power exchanges can be simulated using the same process of the proposed method for the initial estimation of the priority set (or for any other priority set).

Based on these values, it is possible to modify the initial estimation of the priority set by an evolutionary algorithm (73) like PSO or EPSO. Such modifications are performed to optimize a user-defined objective function. This objective function is defined in order to find optimal priorities for the new interval, for example, the ones that maximize the use of renewables, limit the employment of variable generation sources, penalize not to cover a certain loads demand, etc.

Finally, after enough iterations of the evolutionary method, an optimal or sufficiently good priority set ($p_A^O$, $p_R^O$, $p_{Hn}^O$) is obtained and passed (74) to all the data model units (2) of the intelligent devices (1).

The invention claimed is:

1. System for the distributed control and management of a microgrid, the system comprising functionality of one or more power devices and a plurality of intelligent devices in communication through a network, the power devices and plurality of intelligent devices having associated hardware to carry out their respective functionality, each intelligent device comprising:
   a data model unit for storing and updating a data model with global parameters related to the elements of the microgrid;
   a plurality of modules in communication with the data model unit, including an input profile generator module and an exchange manager module;
   wherein every time a global parameter is updated in the data model unit of an intelligent device said updated global parameter is replicated in the data model units of the remaining intelligent devices;
   wherein the plurality of intelligent device in turn comprises a first set of intelligent devices, wherein each intelligent device of said first set is associated and in communication with a different power device of the microgrid such that its data model unit is configured to collect data monitored by the associated power device;
   wherein the data model unit of every intelligent device stored the same global parameters related to all elements in the microgrid, the global parameters including available ranges of active power, reactive power and/or harmonic power that all the power devices in the microgrid can produce or consume in the next iteration;
   wherein the input profile generator module of each intelligent device of the first set is configured for iteratively calculating an available range of active power, reactive power and/or harmonic power that the associated power device can produce and/or consume in the next iteration;
   wherein the exchange manager module of each intelligent device is configured for iteratively calculating an active power exchange, a reactive power exchange and/or a harmonic power exchange between all the power devices of the microgrid taking into account the available ranges of power of the power devices and at least one input parameter for each intelligent device, said at least one input parameter for each intelligent device, said at least one input parameter including at least one priority parameter associated to each intelligent device;
   wherein the at least one priority parameter comprises, for at least one kind of power exchange to be produces and/or consumed:
   an own priority value, which for the intelligent devices of the first set represents the priority of the associated power device within the microgrid, such that power devices assigned to intelligent devices with higher own priority are scheduled to be served over power devices assigned to intelligent devices with lower own priority, and
   a limit priority value, which for the intelligent devices of the first set represents the required minimum own priority value with which the associated power device is willing to exchange power;
   and wherein all the exchange manager modules are coordinated to simultaneously calculate power exchanges at each iteration so that all the input values for every exchange manager module are the same.

2. System according to claim 1, wherein the plurality of intelligent devices further comprises a second set of intelligent devices, wherein at least one intelligent device of said second set comprises a system supervisor and alert manager module for monitoring the correct operation of the elements of the microgrid and managing an alert in case of malfunction, and such that its input profile generator module is configured for interatively calculating the range of active power, reactive power and/or harmonic power to be injected to the microgrid to improve stability of the microgrid or to modify the impedance of the electric lines of the microgrid.

3. System according to claim 1, wherein the plurality of modules in communication with the data model unit also includes an optima calculation of priority parameters module for interatively calculating an optimal set of priorities to be applied on all the intelligent devices for a period of time using estimations of the supply and demand.

4. System according to claim 1, wherein the at least one input parameter for each intelligent device includes a geographical criterion, which for the intelligent devices of the first set considers the location of the associated power device within the microgrid; wherein the geographical criterion is based on assigning different groups within the microgrid, so that agreements of power exchange between elements of the microgrid are established according to the at least one priority parameter associated to the corresponding intelligent device, and among elements of the microgrid with the same value for said priority parameter for which at least one but not all the elements can achieve the required power exchange, agreements that minimize the total amount of active power, the reactive power and/or harmonic power flowing between different groups take precedence.

5. System according to claim 1, wherein the at least one input parameter for each intelligent device includes a geographical criterion, which for the intelligent devices of the first set considers the location of the associated power device within the microgrid; wherein the geographical criterion is based on assigning different groups within the microgrid, so that agreements of power exchange between elements of the microgird within the same group are first established, and the remaining elements of the microgird not achieving the required power exchange establish a power exchange agreement with elements of the microgrid belonging to a different group, and wherein the geographical criterion is also based in limiting the maximum active power, reactive power and/or harmonic power each group can produce or consume.

6. System according to claim 1, wherein the at least one input parameter for each intelligent device includes an interest parameter indicative of a level of interest in the power exchange to be performed between elements of the microgrid.

7. System according to claim 6, wherein the input profile generator module of each intelligent device is configured to obtain the interest parameter.

8. System according to claim 1, wherein one of the intelligent devices acts as a coordinator configured for coordinating all the exchange manager modules to simultaneously calculate power exchanges at each iteration, and wherein the assignment of an intelligent device acting as a coordinator is variable in time.

9. System according to claim 1, wherein the plurality of modules in communication with the data module unit of each intelligent device of the first set include a system supervisor and alert manager module for:
   monitoring the correct operation of the associated power device by comparing the power exchange calculated for said associated power device with the corresponding measurement of power, and
   managing an alert in case of malfunction.

10. System according to claim 9, wherein the system supervisor and alert manager module of at least one intelligent device of the first set is additionally configured for monitoring the correct operation of the elements of the microgrid and managing an alert in case of malfunction, and such that its input profile generator module is configured for iteratively calculating the range of active power, reactive power and/or harmonic power to be injected to the microgrid to improve stability of the microgrid or to modify the impedance of the electric lines of the microgrid.

11. System according to claim 9, wherein in case of detecting malfunction of an associated power device, the system supervisor and alert manager module of the intelligent devices of the first set is configured to disconnect said associated power device from the microgrid.

12. System according to claim 1, further comprising a common database where the global parameters are stored and updated, such that the data model unit of the intelligent devices is configured to update the global parameters of the microgrid by retrieving said information from the common database.

13. Method for the distributed control and management of a microgrid, the method implemented with hardware-based functionalities including one or more intelligent devices and power devices, the method being carried out by associated hardware of the one or more intelligent devices and power devices, comprising:
  storing and updating, in a plurality of intelligent devices in communication through a network, a data model with global parameters related to the elements of the microgrid;
  wherein every time a global parameter is update in an intelligent device, replicating said updated global parameter in the remaining intelligent devices;
  wherein the plurality of intelligent devices in turn comprises a first set of intelligent devices, wherein each intelligent device of said first set is associated and in communication with a different power device of the microgrid, the method comprising:
  collecting data monitored by each associated power device;
  wherein every intelligent device stores the same global parameters related to all elements in the microgrid, the global parameters including available ranges of active power, reactive power and/or harmonic power that all the power devices in the microgrid can produce or consume in the next iteration;
  wherein the method further comprises:
  each intelligent device iteratively calculating an available range of active power, reactive power and/or harmonic power that the associated power device can produce and/or consume in the next iteration,
  each intelligent device iteratively calculating an active power exchange, a reactive power exchange and/or a harmonic power exchange between all the power devices of the microgrid taking into account the available ranges of power of the power devices and at least one input parameter for each intelligent device said at least one input parameter including at least one priority parameter associated to each intelligent device;
  wherein the at least one priority parameter comprises, for at least one kind of power exchange to be produced and/or consumed:
  an own priority value, which for the intelligent devices of the first set represents the priority of the associated power device within the microgrid, such that power devices assigned to intelligent devices with higher own priority are scheduled to be served over power devices assigned to intelligent devices with lower own priority, and
  a limit priority value, which for the intelligent devices of the first set represents the required minimum own priority value with which the associated power device is willing to exchange power; such that all the intelligent devices are coordinated to simultaneously calculate power exchanges at each iteration using the same input values.

14. Method according to claim 13, wherein the plurality of intelligent devices comprises a second set of intelligent devices, the method further comprising monitoring, by at least one intelligent device of said second set, the correct operation of the elements of the microgrid and managing an alert in case of malfunction, and calculating the range of active power, reactive power and/or harmonic power to be injected to the microgrid to improve stability of the microgrid or to modify the impedance of the electric lines of the microgrid.

15. Method according to claim 13, further comprising iteratively calculating an optima set of priorities to be applied on all the intelligent devices for a period of time using estimations of the supply and demand.

16. Method according to claim 13, wherein the at least one input parameter for each intelligent device includes a geographical criterion, which for the intelligent devices of the first set considers the location of the associated power device within the microgrid; wherein the geographical criterion is based on assigning different groups within the microgrid, so that agreements of power exchange between elements of the microgrid are established according to the at least one priority parameter associated to the corresponding intelligent device, and among elements of the microgrid with the same value for said priority parameter for which at least one but not all the elements can achieve the required power exchange, agreements that minimize the total amount of active power, the reactive power and/or harmonic power flowing between different groups take precedence.

17. Method according to claim 13, wherein the at least one input parameter for each intelligent device includes a geographical criterion, which for the intelligent devices of the first set considers the location of the associated power device within the microgrid; wherein the geographical criterion is based on assigning different groups within the microgrid, so that agreements of power exchange between elements of the microgrid within the same group are first established, and the remaining elements of the microgrid not achieving the required power exchange establish a power exchange agreement with elements of the microgrid belonging to a different group, and wherein the geographical criterion is also based in limiting the maximum active power, reactive power and/or harmonic power each group can produce or consume.

18. Method according to claims 13, wherein the at least one input parameter for each intelligent device includes an interest parameter indicative of a level of interest in the power exchange to be performed between elements of the microgrid.

19. Method according to claim 13, further comprising one of the intelligent devices coordinating all the exchange manager modules to simultaneously calculate power exchanges at each interaction, and wherein the assignment of an intelligent device acting as a coordinator is variable in time.

20. Method according to claim 13, further comprising monitoring, by each intelligent device of the first set, the correct operation of the associated power device by comparing the power exchange calculated for said associated power device with the corresponding measurement of power, and managing an alert in case of malfunction.

21. Method according to claim 20, further comprising monitoring, by at least one intelligent device of the first set, the correct operation of the elements of the microgrid and managing an alert in case of malfunction, and iteratively calculating the range of active power, reactive power and/or harmonic power to be injected to the microgrid to improve stability of the microgrid or to modify the impedance of the electric lines of the microgrid.

22. Method according to claim 20, further comprising disconnecting an associated power device from the microgrid in case of detecting malfunction of said associated power device.

23. Method according to claim 13, further comprising storing an updating the global parameters in a common database, such that the intelligent devices update the global parameters of the microgrid by retrieving said information from the common database.

\* \* \* \* \*